United States Patent [19]

Fritsch

[11] Patent Number: 5,020,916
[45] Date of Patent: Jun. 4, 1991

[54] APPARATUS FOR CONTINUOUSLY TREATING LIQUIDS, EMULSIONS AND THE LIKE

[76] Inventor: Rudolf P. Fritsch, Goslarerstrasse 58, D7000 Stuttgart 31, Fed. Rep. of Germany

[21] Appl. No.: 256,261

[22] Filed: Oct. 11, 1988

Related U.S. Application Data

[63] Continuation of Ser. No. 871,422, filed as PCT DE85/00283 on Aug. 22, 1985, published as WO86/01432 on Mar. 13, 1986, abandoned.

[30] Foreign Application Priority Data

Aug. 22, 1984 [DE] Fed. Rep. of Germany ....... 3430885

[51] Int. Cl.$^5$ .............................................. B01F 7/26
[52] U.S. Cl. .................................... 366/97; 366/144; 366/146; 366/147; 366/301; 366/315; 422/135; 422/225
[58] Field of Search ........... 366/64, 65, 96–98, 366/100, 103, 104, 147, 144, 146, 156, 157, 292–301, 315, 325, 82–84, 318; 425/200, 204, 207, 208; 422/131, 134, 135, 137, 138, 225, 226, 229

[56] References Cited

U.S. PATENT DOCUMENTS

| | | |
|---|---|---|
| 2,584,225 | 2/1952 | Plunguian et al. . |
| 2,668,756 | 2/1954 | Corney ................................ 366/301 |
| 2,814,472 | 11/1957 | Erdmenger ......................... 366/97 |
| 3,195,868 | 5/1984 | Loomans . |
| 3,243,128 | 3/1966 | Tight ................................ 366/315 |
| 3,442,065 | 5/1969 | Foras . |
| 3,741,272 | 6/1973 | Ullrich et al. . |
| 4,124,307 | 11/1978 | Anisic ................................ 366/147 |
| 4,173,417 | 11/1979 | Kruder ................................ 366/89 |
| 4,304,537 | 12/1981 | Kirjavainen et al. ............... 366/145 |
| 4,343,929 | 8/1982 | Sugio et al. ......................... 366/97 |
| 4,416,544 | 11/1983 | Blach ................................ 366/85 |
| 4,432,650 | 2/1984 | Langen et al. ..................... 366/147 |
| 4,478,519 | 10/1984 | Guibert ............................. 366/157 |
| 4,499,561 | 2/1985 | Mason et al. ...................... 366/156 |
| 4,514,090 | 4/1985 | Neubauer et al. .................. 366/97 |
| 4,591,487 | 5/1987 | Fritsch . |

FOREIGN PATENT DOCUMENTS

| | | |
|---|---|---|
| 1211904 | 3/1966 | Fed. Rep. of Germany ...... 366/297 |
| 1298083 | 6/1969 | Fed. Rep. of Germany . |
| 1595735 | 8/1969 | Fed. Rep. of Germany . |
| 1906504 | 8/1970 | Fed. Rep. of Germany . |
| 2802125 | 7/1979 | Fed. Rep. of Germany . |
| 3030541 | 2/1982 | Fed. Rep. of Germany . |
| 956605 | 2/1950 | France . |
| 2078292 | 11/1971 | France . |
| 1227493 | 4/1971 | United Kingdom . |
| 2069356 | 8/1981 | United Kingdom . |

OTHER PUBLICATIONS

"Kontinuierlich Arbeitende .." (Continuously Operating) article by Maier, Fette Seifen-Anstrichmittel, 61st year, No. 8, 1959 pp. 686–690.

Primary Examiner—Philip R. Coe
Assistant Examiner—Joseph S. Machuga
Attorney, Agent, or Firm—Frishauf, Holtz, Goodman & Woodward

[57] ABSTRACT

Apparatus for the continuous processing, such as mixing, homogenizing, gassing and degassing, polymerizing of liquids, emulsions, suspensions, viscous substances and similar materials, is designed with several shafts (1) arranged vertically in ring fashion, with parallel axes and driven in equal direction. Each shaft carries a number of disk-shaped processing elements (13-15) arranged axially staggered in parallel planes, meshing with elements on adjacent shafts, and enclosing together with the shafts at least one central cavity or chamber (16) in whose area the processing elements are arranged in such a way that their circumferential surfaces are exposed. The material is efficiently mixed and homogenized while being handled gently and evenly, and local shearing stress leading to temperature peaks in the material is avoided by leaving the surfaces (130, 140) of the processing elements exposed on the outside, i.e. on the side facing away from the chamber (16). A jacket (5) may be provided, spaced substantially from the exposed surfaces so as to have no interactive effect with the materials on the processing elements.

21 Claims, 6 Drawing Sheets

APPARATUS FOR CONTINUOUSLY TREATING LIQUIDS, EMULSIONS AND THE LIKE

This application is a continuation of application Ser. No. 06/871,422, filed Mar. 31, 1986, abandoned.

The invention relates to an apparatus for the continuous processing, such as mixing, homogenizing, gassing and degassing, polymerization, etc., of liquids, emulsions, suspensions, viscous substances and similar materials.

BACKGROUND

Apparatus of this kind is described in U.S. Pat. No. 4,591,487, by the inventor hereof, to which German Pat. No. 30 30 541 corresponds. This apparatus has several shafts arranged vertically on a theoretical ring, with parallel axes and driven in the same direction. Each shaft carries a number of disk-shaped processing elements arranged axially in a row and in parallel planes, meshing with processing elements on adjacent shafts. The shafts and processing elements define at least one cavity therebetween, in which the processing elements are arranged in such a way that their circumferential surfaces are exposed. The shafts have their ends rotatably mounted inside a housing, which also also has arrangements for the intake and discharge of the material to be processed. An outer housing closely surrounds the envelope of the processing elements. The housing wall surrounding the disk-shaped processing elements is formed with tub-shaped recesses of the housing wall, which are arranged in a rosette-shaped housing liner, in whose tub-shaped recesses the processing elements of each shaft mesh with very narrow play. The cavity enclosed by the shafts can be connected to a negative pressure source, so that it functions as degassing chamber for the material which is continuously transported toward the cavity by the processing elements and which surrounds the cavity wall in the form of a drum-like layer which has the characteristics of a "thick film".

In the area of the narrow gap between the outer circumferential surfaces of the processing elements and the adjacent wall of the tub-shaped recesses surrounding the processing elements on the side opposite the cavity, the material being processed is locally subjected to a very high degree of shearing stress which can damage the material being processed. These locally occurring stress peaks are largely uncontrollable because they are influenced by such factors as misalignment of the housing, oscillations of the shafts, non-homogeneities of the material for processing, etc. For example, in the processing of polymers, local temperature peaks occur in the areas mentioned; these are not directly measurable because they occur in narrowly defined places surrounded by undamaged material, but they can be detected because the processed polymers are subject to a loss of strength that can only be explained by the presence of thermally damaged polymer material.

A screw-type machine, such as the one described in German Pat. No. DE-OS 28 02 125, may be used to incorporate reinforcement fibers into polymers in such a way that the fibers and the polymeric mixture are fed into the apparatus in advance of a plasticizing zone. Upon melting of the polymer, it was found that a large portion of the fibers had been ground into the pure filler or reduced to fiber fragments upon transport through the narrow gaps between the housing wall and the processing elements. This reduces the stability of the material considerably and is a great disadvantage in many areas of application.

The same applies in the processing of thermally very sensitive materials, for example in the production of chocolate, where sugar and fats have to be blended and very finely dispersed. Here the material has to be processed on the one hand with a very high degree of shearing force and, on the other hand, the fats must not turn rancid. But in spite of cooling of the kneader shafts, local overheating can hardly be prevented since for example the processing elements opposite the housing heat and are subject to a certain amount of local wear, together with the housing whose circumferential surface interacts with them.

In any apparatus whose processing elements are enclosed by a housing that surrounds them leaving narrow play, the gap between the processing elements and the housing is not exactly defined. Such apparatus therefore is generally unsuited for processes in which biologically active materials containing microorganisms are handled. Such microorganisms can reach sizes of up to 0.3 mm; they are very susceptible to pressure and crushing.

THE INVENTION

If is an object to provide an apparatus for the continuous processing such as mixing, homogenizing, gassing and degassing, polymerizing, etc., of liquids, emulsions, suspensions, viscous substances and similar materials, which results in highly effective mixing and homogenizing of the material while ensuring the careful processing and the prevention of excessive local shearing stress and the resulting local temperature peaks in the material processed.

Briefly, the processing elements are positioned in such a way that, at least along a longitudinal part of the shafts, the circumferential surfaces opposite the sides thereof facing the inside cavity or chamber, that is, at their outside, in outer regions opposite the cavity, are uncovered, or free; or, if a housing is used, it is spaced from the outer envelope of the processing elements by a substantial radial distance forming a free space in which no interaction of the material to be processed occurs with any surface, other than the surfaces of the processing elements themselves.

In this apparatus the material is thus processed only between those surfaces of the disk-shaped processing elements that are juxtaposed and in relative motion to each other. The material is constantly spread into thin, even layers with a large surface, having "thin film" characteristics. These "thin films" are constantly renewed, united and mixed with the "thick film" that is present either at the region of the cavity enclosed by the shafts or present at the radially opposite outer surface region. Since the processing elements are exposed not only on the side of the cavity, they, together with the shafts, define free edges. Since they are not enclosed by a housing, no narrow, uncontrolled gaps are present through which material could be squeezed and where local overheating then would occur.

Surprisingly, it was found that the elimination of the tub-like housing parts that, in the prior art, wholly or partly enclose the disk-like processing elements, does not not reduce mixing, but even provides improved homogenization and mixing effects. Depending on the type and viscosity of the processed material, the processing elements arranged on the shafts can wholly or partly be designed as processing disks coaxial to the shafts with a shape other than a circle concentric with the shaft axis and arranged in staggered order and at an angle to each other. such processing disks have been described and illustrated in detail in U.S. Pat. No. 4,591,487, Fritsch, where, however, they work together with the tub-shaped recesses parallel to each shaft axis, in which they engage with very narrow play, so that different processing conditions for the material to be processed will obtain.

Particularly in the processing of liquids or substances of low viscosity, the processing elements can be designed as circular processing disks coaxial to the shafts and meshing in such a manner that thin gaps will result between axially adjacent, meshing disk surfaces which move in relation to each other. The material is spread into thin layers in these gaps. Such circular processing disks can also be combined with disk-shaped processing elements whose shape is other than circular. Different processing elements can be arranged along the length of the shafts in groups; the circular processing elements can be assigned to the processing of materials in a state of low viscosity.

Coaxial, circular spacer or separating disks can be arranged on the shafts between adjacent processing elements; these spacer disks are placed roughly in the same plane as those of their adjacent shafts. Their radial dimensions are so calculated that taking the sum of their radii minus their working clearance corresponds to the axial spacing of adjacent shafts. In a preferred embodiment, the spacer disks of all shafts can have the same diameter, which means that the diameter of such a spacer disk equals the axial distance of adjacent shafts minus the working clearance.

The gap that exists between the surfaces of interacting, disk-like processing elements moving in relation to each other depends partly on the type and viscosity of the material processed. Incidentally, the same applies to the diameter of the processing elements and the rotating speed of the shafts. For many applications it has proven practical to design the gap in the order of 0.7 mm or smaller.

To ensure the safe intake and discharge of material for the processing elements of the shafts and to prevent the loss of material during processing, it is of advantage when the housing has, on the material intake and discharge side, a housing section that encloses at least part of the circumference of the processing elements of the shafts with a gap less than about 0.7 mm. The two housing sections are for example vacuum-tightly connected together by a tubular housing jacket whose inner wall is located at a radial spacing from the circumferential surfaces of the processing elements which it surrounds.

The regions in which, as known, on the material intake and discharge side, the processing elements are enclosed over at least a part of their circumference by a housing section are, in terms of the overall length of the shafts, so short that local overstressing of the material is not yet a factor or a negligible factor. If the housing is hermetically sealed, the apparatus can be used for degassing or also for gassing the material under pressure.

Favorable material intake conditions result when, on the material intake side of the housing section, a ring channel is provided that lies within and/or outside the sector enclosed by the shaft axes. This channel serves as material intake and communicates with the processing elements enclosed by the housing section. This is a way to achieve in simple manner an even supply of material to the processing elements of each shaft. It is also of advantage to form the housing section on the material intake side in the sector enclosing the processing elements with conically widening wall parts, so that the material placed on the processing elements is increasingly able to spread towards the layer produced by the processing elements, thus creating a sector where gradual transition can take place.

It can also be desirable to provide the shafts with a sector with positively conveying processing elements downstream from a short sector with circular disk-shaped processing elements enclosed by the housing section. The axial length of the shaft sector is at least half the diameter of the circular disk-shaped processing elements. The circular disk-shaped processing elements effect even distribution of the material conveyed to them by the supply mechanisms, while the axially adjacent processing elements which positively convey material provide for a dwell time of material in the apparatus suitable for the particular substance being processed.

To facilitate the careful discharge of the processed material and to prevent material from remaining in the apparatus, which would be a disadvantage especially when there is a change in the material to be processed, and which would interfere with the cleaning of the apparatus, it is advantageous to shape the housing section on the material discharge side in the sector surrounding the processing elements with wall parts that taper conically in downstream direction. The shafts in the sector enclosed by the housing section can also carry positively conveying processing elements, so that the processed material can be discharged from the apparatus with a predetermined conveying pressure. A practical solution is to design the positively conveying processing elements as meshing screws whose axial length at least equals the product of the number of shafts times the pitch of the screws.

In principle, the positively conveying processing elements of each shaft can convey via single outlets, for example into a common pan; however, it is advantageous to so arrange the apparatus that the housing section on the material discharge side has at least one ring channel for the material discharge. The ring channel communicates with the processing elements enclosed by the housing section.

When the apparatus is used for degassing, etc., of the material, a negative pressure pipe leading into the cavity surrounded by the processing elements and connected to a negative pressure source can be included in the housing section on the material input or discharge side. The negative pressure pipe communicates via channels with the ring chamber that is radially bordered by the housing jacket and the processing elements.

Alternatively, the housing can also contain at least one, if need be interchangeable, input line for additives that opens into the vicinity of a predetermined section of the processing elements of at least one shaft.

When the type of material processed requires the introduction of outside heat for processing, the design can be very simple if the shafts and/or the metallic processing elements are inductively heated by means of induction coils arranged in such a way that the surround all the shafts. The power supply of such induction coils can be closely regulated so that the heat supplied to the processed material can also be adapted exactly to the specific requirements, especially since the metal surface with which the material comes in contact is relatively large, making small thermal gradients possible.

It is frequently necessary, especially in processing viscous substances, to remove heat created in the kneading process, to prevent thermal damage to the material. In such cases, the shafts can be designed with hollow bores in which a coolant is carried.

Finally, it is practical when both ends o the shafts are mounted in the housing sections which together with the vertical arrangement of the shafts ensures a narrow working clearance for the gaps between the processing elements.

The new apparatus can be used extensively for mixing, homogenizing, kneading and similar forms of processing of various materials. It is surprising that the apparatus is also suited for incorporating biological catalysts, oxygen, gases or other substances into biologically active materials in microbiological conversion processes.

The apparatus treats the material it handles so carefully that the microorganisms are not damaged as the material is continuously and slowly spread into thin films or layers and worked through, while the biologically active material is being very effectively mixed with substances such as oxygen, etc.

DRAWINGS

The drawings shows embodiments of the object of the invention, as follows.

DETAILED DESCRIPTION

Figure 1:
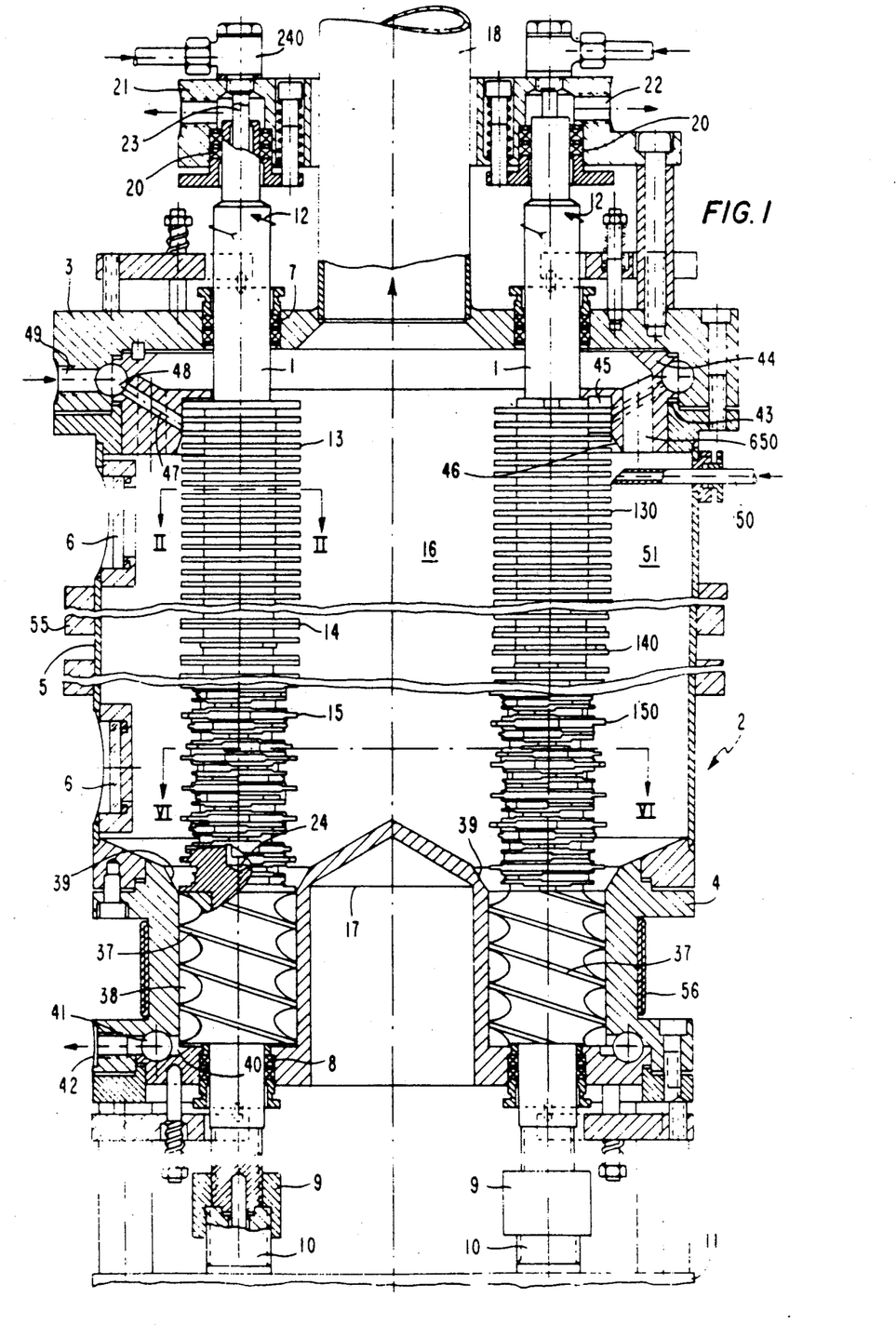
FIG. 1 shows an apparatus according to the invention in a first embodiment, in axial section, in a lateral view.
Figure 9:
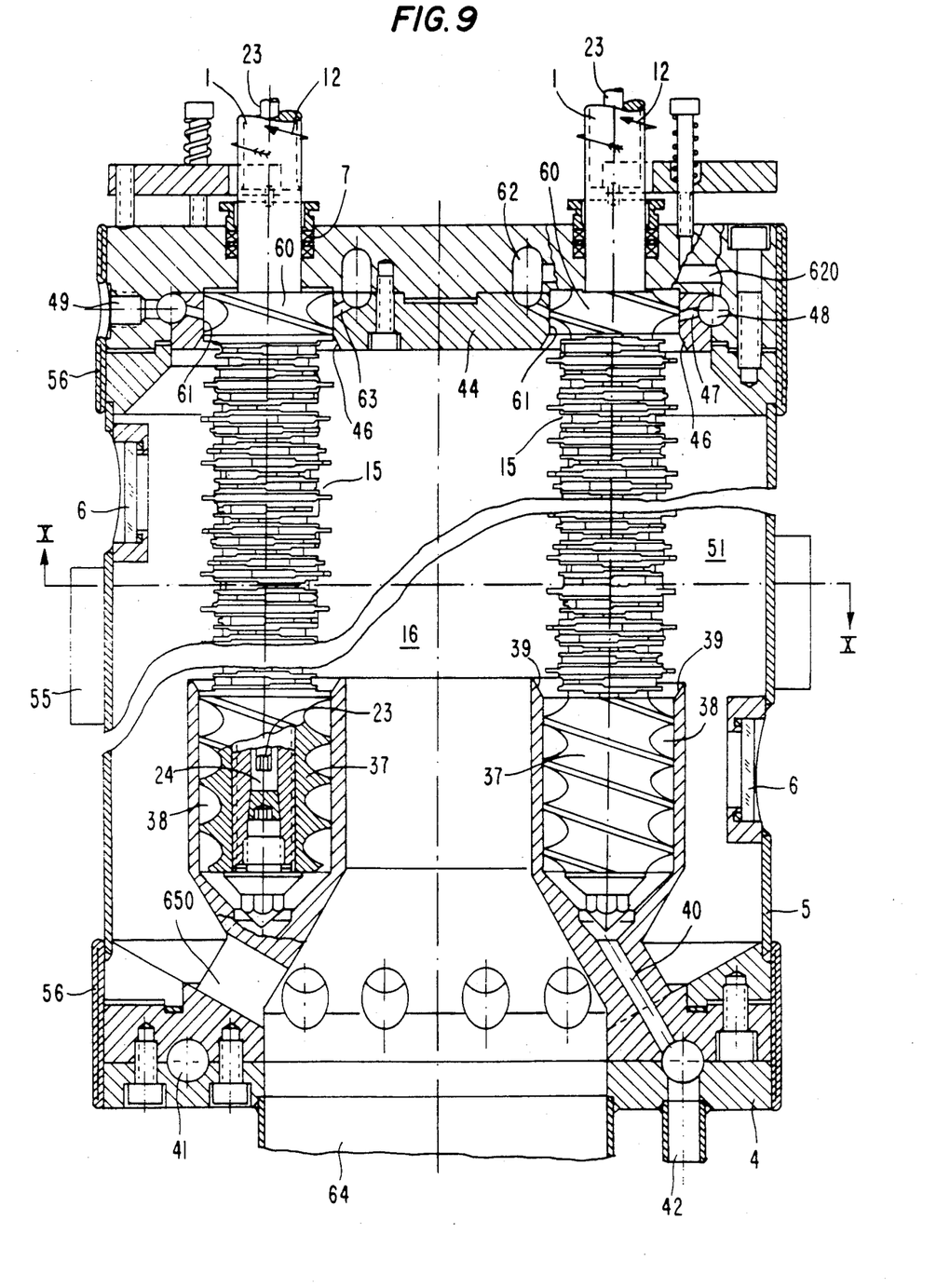
FIG. 9 shows an apparatus according to the invention in a second embodiment, in axial section and in a lateral view.
Figure 10:
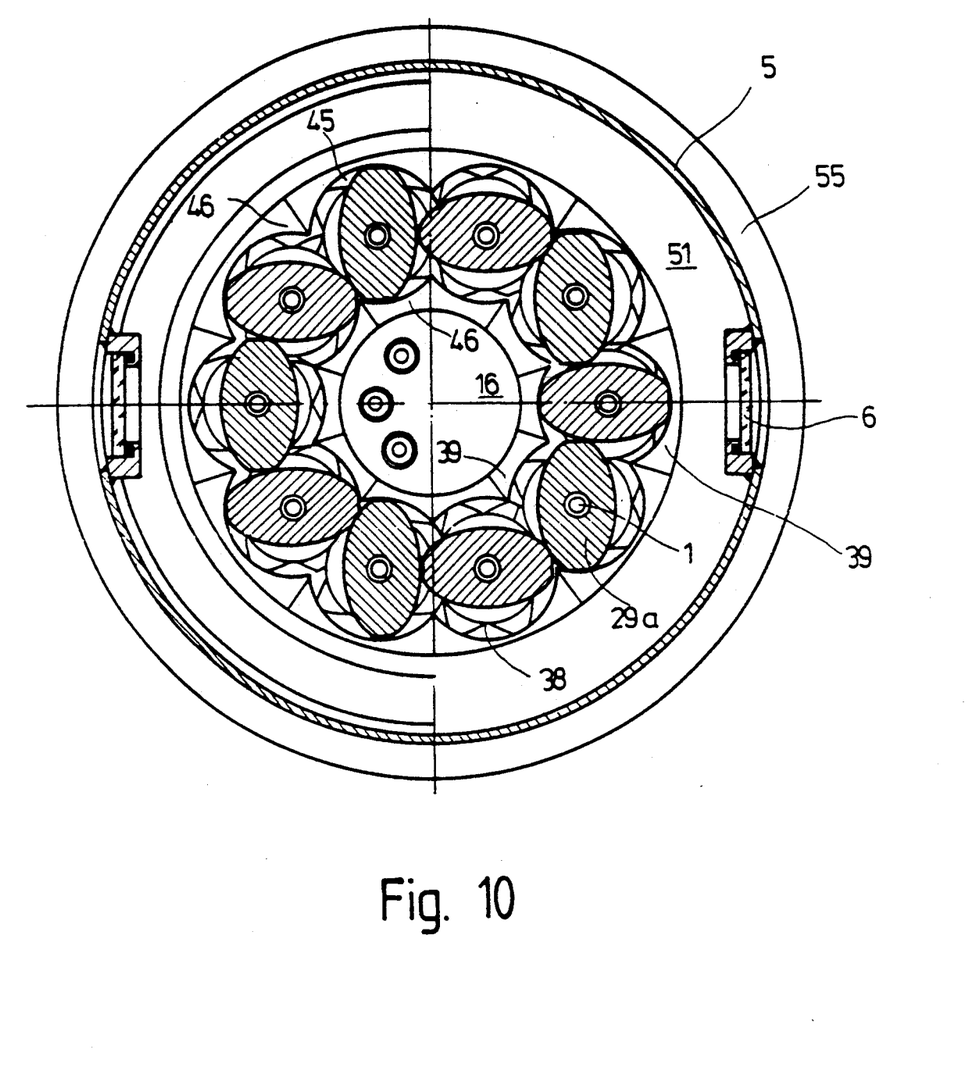
FIG. 10 is a top view of the apparatus according to FIG. 9, cut along line X—X of FIG. 9.

The apparatus shown in two embodiments in FIGS. 1, 9 and 10 serves the purpose of continuous processing such as mixing, homogenizing, gassing and degassing, polymerizing of liquids, emulsions, suspensions, viscous substances and similar materials. It contains a number of, in this case ten, shafts 1 arranged vertically in ring fashion, with parallel axes lying in the generated surface of a common theoretical circular cylinder. These shafts 1 are enclosed by a largely drum-shaped housing 2 which has an approximately disk-shaped upper housing part 3 and an also largely disk-shaped lower housing part 4, both of which are vacuum-tightly connected with each other by a cylindrical housing jacket 5 which runs coaxially to the theoretical cyilnder associated with the axes of shafts 1. The housing jacket 5 is designed with hermetically sealed viewing glasses 6 which provide a view into the inside of the housing from outside. Both ends of shafts 1 are rotatably mounted in bearings 7, 8 of the upper housing section 3 and the lower housing section 4, respectively. They are connected by means of approprieated couplings 9 to aligned drive shafts 10 of a planetary gear which provides the individual shafts 10 with a drive in equal direction and with equal speed, as indicated by arrows 12.

Each of the shafts 10 carries axially stacked disk-shaped processing elements 13, 14, 15 arranged in rows, lying in parallel, horizontal planes. The processing elements are of various designs and, as shown in FIG. 1, are arranged in axially stacked groups. The spacing of the axes of adjacent shafts 1 is chosen in such a way that the processing elements 13, 14, 15 of adjacent shafts can mesh or interdigit in comb-like manner shown in FIGS. 2, 5, 6, 7 and 8. Together with the shafts 1, the meshing processing elements 13, 14, 15 of the shafts arranged in ring fashion enclose a largely cylindrical cavity 16 to which the circumferential surfaces 130, 140, 150 of the processing elements 13, 14, 15 are exposed, i.e. these surfaces are not covered by associated housing parts or the like.

The underside of cavity 16 is sealed by wall part 17 of the lower housing section 4, and said wall part 17 is adapted to the shape of the said cavity 16. A coaxial suction pipe 18 that is connected to a negative pressure source (not shown) which provides a negative pressure for cavity 16, extends from above and opens into said cavity 16.

As an alternative, pipe 18 can also be connected to a pressure gas source, conveying into cavity 16 gas that can be incorporated into the material for processing in a manner that will be described below.

Shafts 1 have been hollowed out from above, while their ends are inserted via pressure-tight bearings 20 into a brine distributor ring 21 to which brine discharge lines can be connected at 22. Brine intake pipes 23 are inserted from above into the hollow bores of shafts 1 at a radial distance, ending at 24 in the vicinity of the of the lowest processing elements 15; the brine intake pipes 23 allow the insertion of brine, a coolant, into the hollow bores of the shafts via connector fittings 240, so that shafts 1 can be cooled at least in the area of the processing elements 13–15.

Figure 2:
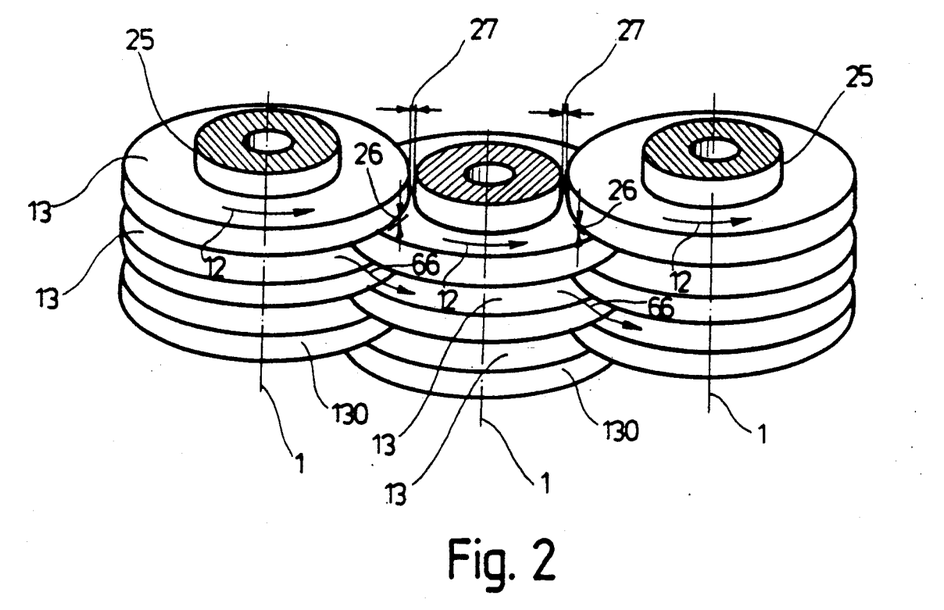
FIG. 2 is a fragmentary view of three adjacent shafts of the apparatus according to FIG. 1 with the associated circular disk-shaped processing elements, in perspective section along line II—II of FIG. 1.

The design of the processing elements 13, 14, 15 used in the above described apparatus—also called a reactor—is illustrated especially in FIG. 2-8:

The processing elements 13 (FIG. 2) arranged in the area of the upper housing section 3 and thus on the material intake side are circular disks with a typical thickness of 2–3 mm, arranged coaxially on the associated shafts. The circular disk-shaped processing elements 13 are held by means of coaxial, circular spacer disks 25 at equal, predetermined axial distances with close tolerances, said distances being dimensioned in such a way that a gap 26 of approximately 0.5 mm exists between the adjacent interacting faces of the meshing processing elements 13. FIG. 2 also shows an axial gap of roughly the same size between the circumferential surface 130 of each circular disk-shaped processing element 13 and the circumferential surface of the spacer disk 25 interacting with same.

The dimension of gaps 26, 27 depends on the type and particularly the viscosity of the material to be processed. The same applies to the diameter of the disk-shaped processing elements 13 and the spacer disks 25.

Axially adjacent to the circular disk-shaped processing elements 13 which mesh as described, a group of processing elements 14 provided. They are illustrated in detail in FIG. 3. Each of these processing elements has a circular disk 28 that is coaxial to the associated shaft and carries on a face surface a disk part 29 whose profile deviates from the circular shape of circular disk 28. This disk part 29 has a thickness that is the same as or preferably greater than that of circular disk 28, two of its circumferential surface sections 30 approach the circumferential surface 140 of circular disk 28. The two circumferential surface sections 30 are connected to each other by similar arc-shaped circumferential surface sections 31, so that they appear in top view roughly as an oval disk with corners 32.

Figure 3:
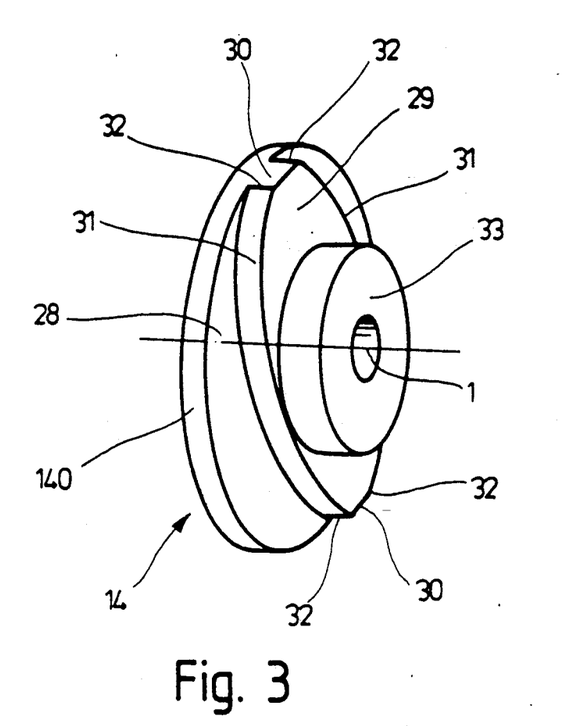
FIG. 3 shows a processing element for a shaft of the apparatus according to FIG. 1, in perspective view.

Onto disk part 29 a coaxial, circular spacer disk 33 has been placed whose diameter has been selected in such a way that the spacer disk and the circular disk part 28 of the processing elements of adjacent shafts 1 interact in a similar fashion as the circular disk-shaped processing elements 13.

The processing elements 14 of meshing adjacent shafts 1 are arranged on the shafts at 90° angles to each other, the disk parts 29 pointing upward on one shaft and downward on another, as illustrated in FIG. 1. This ensures that the disk parts 29 of adjacent shafts 1 work together in the manner shown in principle in FIGS. 6–8, while—as mentioned above—the disk parts 28 and the spacer disks 33 interact in the manner of the processing elements 13.

Figure 4:
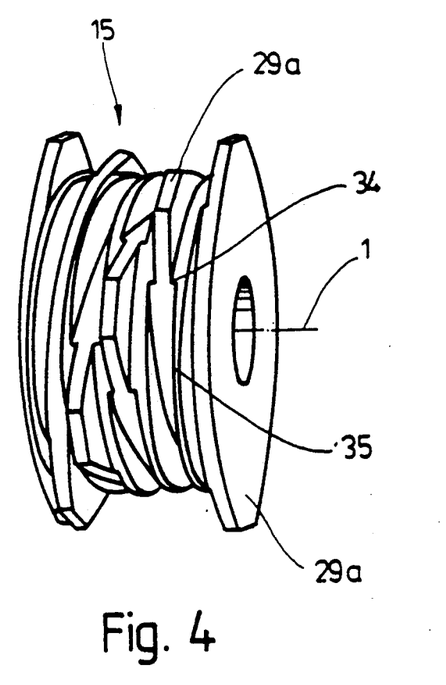
FIG. 4 shows a row of axially successive processing elements for a shaft of the apparatus according to FIG. 1, in perspective view.
Figure 5:
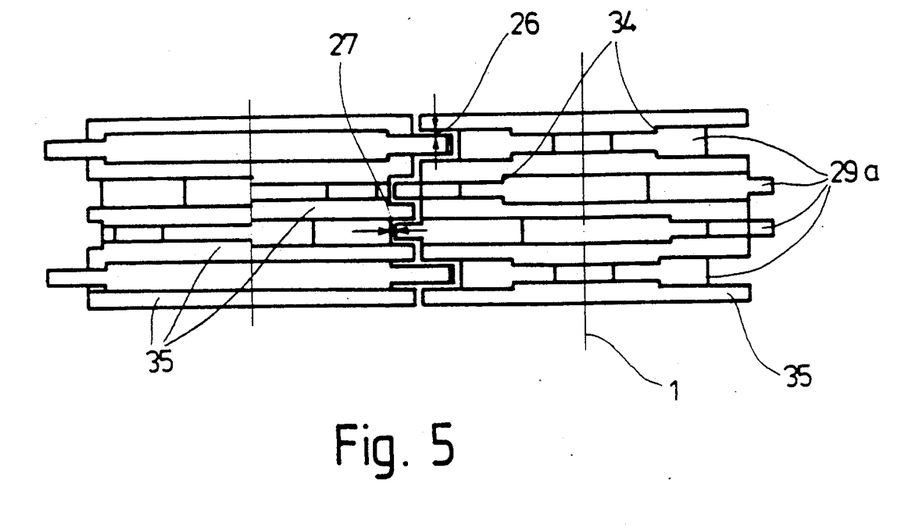
FIG. 5 shows two adjacent shafts of the apparatus according to FIG. 1, in a lateral view, in detail.

The above described group of processing elements 14 is followed axially on each shaft 1 by a group of processing elements 15, as illustrated in FIGS. 4, 5. The processing elements 15 consist largely only of disk parts 29a which deviate from the circular shape and are in principle similar in design to disk parts 29, as illustrated in FIG. 3. Adjacent disk parts 29a are arranged on the shafts at an angle to each other; they mesh with each other as illustrated in FIG. 5, while the required axial gap 26 is adjusted as shown in FIG. 2 by spacer rings and associated ring shoulders 34. The gap has the same dimension as that in processing elements 13.

Between disk parts 29a of the processing elements 15, circular spacer disks 35 (FIG. 5) are provided which rotate with shafts 14 and are secured on shafts 1 at the same level and whose diameter equals the axial distance of adjacent shafts minus the working clearance (as a rule smaller than about 0.5 mm). The spacer disks 35 prevent drop-shaped accumulations of material between meshing disk parts 29a from being moved to the thin-layer side from the thick-layer side.

The group of processing elements 15 is followed on each shaft 1 by a coaxial conveyor screw 37 guided with narrow play inside an associated, partly cylindrical recess 38 of lower housing section 4. FIG. 10 shows how the partly cylindrical recesses 38 merge into each other in their overlapping areas.

The arrangement is designed in such a way that the lower housing section 4 on the material discharge side in the area enclosing the last processing elements 15 is formed with tapering wall parts 39 (FIG. 1) that taper conically in downstream direction, enabling the material to be moved gently to the screws 37. Adjacent screws 37 are arranged so that they mesh with each other; their axial length equals at least the product of the number of shafts 1 times the pitch of the screws 37. Screws 37 form positively conveying processing elements which—depending on the material to be processed—can in some cases be exchanged for other types of positively conveying processing elements.

From the underside of each partly cylindrical recess 38 a branch channel 40 leads to a ring channel 41 formed in the lower housing section 4; said ring channel 41 is arranged outside the theoretical cylinder containing the shaft axes and coaxially to same, and at least one material discharge line 42 leads to the outside from said ring channel 41.

On the material intake side a sealed, largely rosette-shaped wall part 44 is inserted into an associated coaxial, cylindrical groove 43 of the upper housing section 3, said groove 43 having tub-like recesses 45 associated with and coaxial to the individual shafts 1; said recesses 45 of groove 43 surround the adjacent circular disk-shaped processing elements 13 along part of their outside with close clearance. The tub-like recesses 45 are not very long axially, only long enough to reach across about 3–4 circular disk-shaped processing elements 13. Downstream from the said short sector with the processing elements 13 partly surrounded by the tub-like recesses 45 is—as explained earlier—a sector with positively conveying processing elements 14 whose axial length equals at least half the diameter of the circular disk-shaped processing elements 13.

The area partly surrounding the processing elements 13 is formed by the tub-like recesses 45 and downstream with conically widening wall parts 46. Furthermore, into each tub-like recess 45 a branch channel 47 opens openes in star fashion; said branch channel 47 originates in a ring channel 48 that radially surrounds the theoretical cylinder containing the axes of shafts 1 and into which a material intake line 49 opens.

An exchangeable intake line 50 for additives extends through the housing jacket. Typical additives are color concentrates. Line 50 terminates on the periphery of at least one processing element 13 or 14 or 15 of a shaft 1 and thus facilitates flow of concentrates to result in color change.

Figure 6:
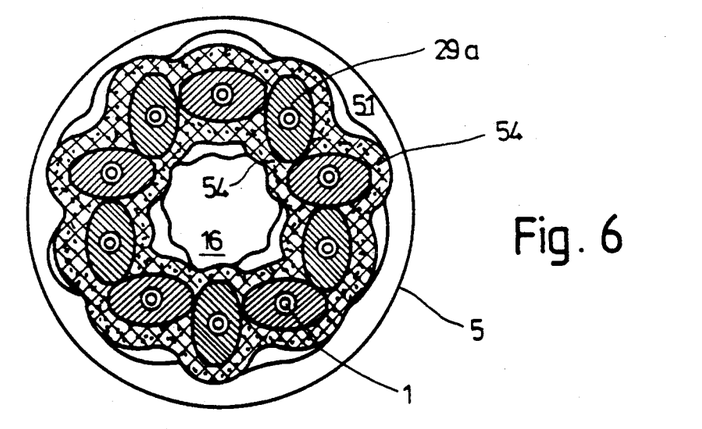
FIG. 6 is a top view of the shafts of the apparatus according to FIG. 1, with the associated processing elements along the line VI—VI of FIG. 1.
Figure 7:
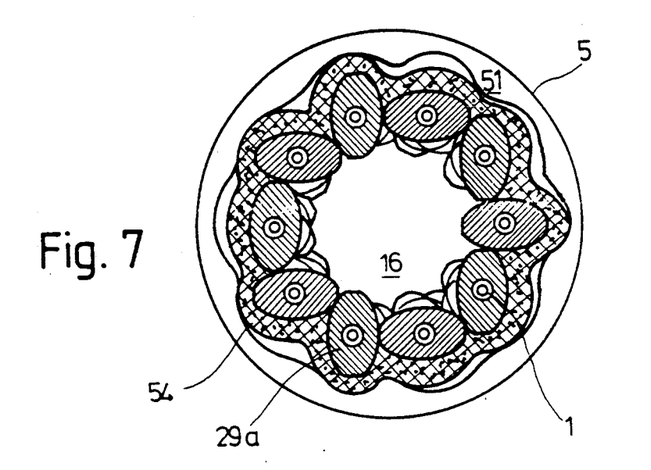
FIGS. 7 and 8 show an arrangement according to FIG. 6, illustrating different arrangements of the so-called "thick film"
Figure 8:
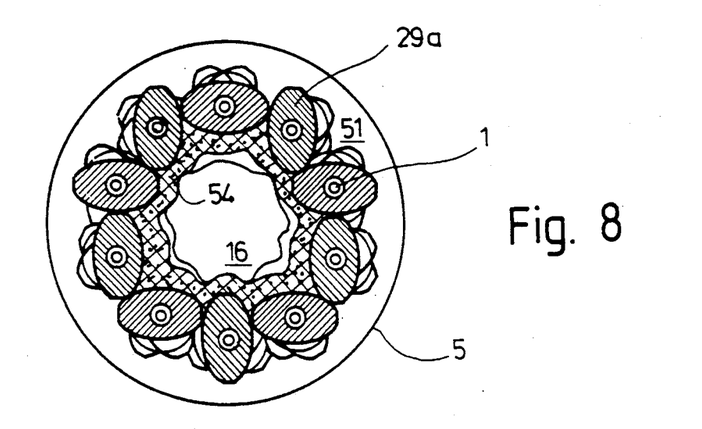

Another branch line 650 is shown another branch line that connects the outer housing chamber 51 with the inner chamber 16, facilitating gassing and degassing in both chambers. operation, with reference to FIGS. 6–8:

Let it be assumed that the apparatus is used for homogenizing a polymer whose viscosity increases during processing.

The relatively fluid material is moved through material intake line 49, ring channel 48 and branch channels 47 into the tub-shaped recesses 45, where it is placed onto the face surfaces of the circular disk-shaped processing elements adjacent to the area where the material arrives. As the result of the rotating movement of shafts 1 the applied material is spread into thin layers determined by the thickness of gaps 26, 27 and between the adjacent, interacting surfaces of processing elements 13. These thin layers lie in the area of cavity 16 (see FIG. 7). By selecting the rotational direction of shafts 1 and appropriately arranging the tub-like recesses 45, i.e. of the material intake, it can also be achieved to have the thin layers lie on the outside of the processing elements bordering ring chamber 51 (FIG. 8), or to have two layers of approximately equal thickness form on both sides, as shown in FIG. 6.

The processing elements 13–15 are—apart from the short axial sector of the tub-like recesses 45 and the screws 37—exposed over the entire length of shafts 1, on the inside facing cavity 16 as well as on the outside bordering ring chamber 51, i.e. they are not covered by the wall parts that interact with them with close play.

Housing liner 5 is in fact arranged at a considerable radial distance.

The material spread into thin layers on the horizontally oriented face surfaces of the circular diskshaped processing elements 13, as described above, is moved during its transport around each shaft axis back to gap 26 where it accumulates and forms a bead. The material that can no longer enter gap 26 or 27 flows after or while over the rim of the processing elements 13 and is moved downwardly by gravity to be pulled into the next gap 26 as indicated by arrows 66 in FIG. 2.

As a rule, on one side of the processing elements 13 a self-contained layer 54 resembling a barrel shell is formed in this manner, as shown in FIGS. 7, 8; said layer rotates as driven by the processing elements 13, carrying the material progressively downward. The material is continuously spread out into thin layers, which in turn are reunited and mixed with the thick layer 54, leading to an excellent homogenization and blending of the material without the necessity of having to be squeezed through gaps of undetermined width. Since shafts 1 are arranged vertically and mounted at both ends, no shaft deflection occurs that could lead to an uncontrolled change in the size of gaps between the processing elements.

The material that acquires increasing viscosity as it moves through the processing elements 13, reaches the area of processing elements 14 where in addition to the already described effect of parts 28, 33 it is subjected to a kneading action by the disk-shaped oval parts 31. However, this kneading action is not achieved—as in known apparatus working with similarly designed processing elements, e.g. according to U.S. Pat. No. 4,591,487—by interaction between the processing elements and wall parts which partly surround these with close play, but exclusively by interaction between moving surfaces of adjacent, meshing processing elements.

After passing the processing elements 14, the material whose viscosity has further increased, is moved into the area of processing elements 15 by which it is kneaded. Here, too, the material is not acted upon by stationary wall parts,.

The spacer disks 35 are arranged between successive disk parts 29a of the processing elements 15, and they interrupt the material flow in the direction of the shaft axes.

Finally, when processing is completed, the highly viscous material is moved over the conically tapering surfaces 39 into the area of screws 37 from where it is discharged under pressure via ring channel 41 and material discharge line 42.

Depending on the type of material processed, shafts 1 can be cooled as already described by means of a coolant added through fitting 240 in the area of the processing elements 13–15. Should the material require it, shafts 1 and the processing elements 13–15 can also be heated. For this purpose, housing jacket 5 is designed with electrical induction coils 55 which surround all the shafts 1 and facilitate a precision heat control by means of induction. In that case the housing jacket 5 is made of an electrically insulating material. Finally, the lower housing section 4 can be provided with a ring heater 56 in the area of the screws 34, to keep the material in a flowable state.

The embodiment shown in FIG. 9, 10 has a design similar to that shown in FIG. 1; in principle it also operates in the same manner. Identical or corresponding parts are shown with the same reference numbers, making additional explanations unnecessary.

In this embodiment which is particularly adapted for the processing of materials of relatively high viscosity, shafts 1 are designed on the material intake side with meshing screws 60 arranged in partly cylindrical recesses 61 of housing part 44. The recesses have a similar design to that of recesses 38 in the lower housing part 4 (shown in FIG. 10). In addition, the material can be fed in via a ring channel 62 lying within the theoretical cylinder containing the axes of shafts 1 and being connected with recesses 61 via branch channels 63.

Following screws 60, the shafts carry only processing elements 15 as shown in FIG. 4, 5; these knead the material and are separated from each other by spacer disks 35 (FIG. 5).

Into cavity 16 opens a negative pressure pipe 64 that is concentrically arranged in the lower housing section 4 and is connected via star-shaped channels 65 to ring chamber 51 enclosed by housing liner 5. This makes it possible to design cavity 16 as well as ring chamber 51 as negative pressure chambers or to lead gas into them by connecting pipe 64 to a pressure gas source.

The lower housing section 4 designed in this manner and supplied with negative pressure pipe 64 and channels 65 could also be used with the embodiment according to FIG. 1.

The apparatus described above in the embodiments according to FIG. 1 and 9 can not only be used for mixing and homogenizing polymers, viscous substances, liquids and similar materials, but surprisingly also for microbiological processing. In all microbiological conversion processes it is essential that microbiologically active materials be thoroughly mixed and at the same time transported in a predetermined manner, while they are handled with the utmost physical care. By selecting an appropriate speed for shafts 1 and appropriate processing elements—especially elements 13—and by carefully dimensioning the processing elements, biological conversion processes can be subdivided into separate successive steps, each of which can be separately controlled.

Such biological conversion processes include the incorporation of biological catalysts into biologically active materials, the incorporation of oxygen or other gases into the material, etc. It is also possible to regulate the temperature of such conversion processes by means of the self-cleaning and self-renewing heat exchange surfaces of the processing elements, for which it is only necessary to cool or heat shafts 1 in a manner already discussed.

Shafts 1 can also be designed to incorporate in one piece the processing elements 13, 14, 15 which are mounted on them to rotate therewith.

In an embodiment of the apparatus tested in the field, the following values were found to be suitable as far as the size of gaps 26, 27 is concerned:

| viscosity of the material (in m Pa s) | width of gaps (in mm) |
| --- | --- |
| 200 | 0.3 |
| 40,000 | 0.5 |
| 400,000 | 0.7 |

Basically, the present invention is directed to leaving the disk face surfaces as well as the edge surfaces of the disk-like processing elements 13, 14, 15; 37, 60, in the region remote from the central chamber or cavity 16, free, unobstructed, open and uncovered, that is, exposed to free space. If a jacket 5 is used, it is spaced by such a distance from the edge surfaces of the processing elements that, in effect, the edge surfaces are exposed to free space. The jacket 5 thus has no interactive effect with the materials being processed and which are on the processing elements 13, 14, 15; 37; 60. The jacket 5 is suitable as a support for the heating coils 55 (FIG. 1) and to maintain gas pressure differentials from atmospheric pressure, as well as to exclude contaminants from ambient space.

I claim:

1. Apparatus for continuous processing of materials including at least one of: liquids, emulsions, suspensions, and viscous substances, by at least one of: mixing, homogenizing, gassing, degassing and polymerizing, having a plurality of essentially parallel vertical shafts (1), each having a center and axially upper and lower terminal regions, said shafts having their centers located on the circumference of a circle;

means for rotating said shafts in the same direction;

upper support means (3) rotatably mounting said shafts at the axially upper terminal regions thereof;

lower support means (4) rotatably mounting said shafts at the axially lower terminal regions thereof;

a plurality of disk-like processing elements (13, 14, 15; 37, 60) secured in axially stacked positions on said shafts for rotation therewith, said disk-like processing elements defining disk face surfaces and edge surfaces, said disk-like elements on adjacent shafts being interdigited or interengaged with each other, said interengaged processing elements, in combination with said shafts, defining a common interior chamber (16) inwardly of said circle, material supply means (47-49) extending through one of said support means for the shafts and communicating with one of the adjacent terminal regions of said shafts; and processed material removal means (40-42) extending through the other support means for the shafts and communicating with the other of the terminal regions of said shafts; wherein, said processing elements (13, 14, 15; 37, 600) define, at least over a portion of the axial length of the shafts, inner disk face surfaces and edge surfaces which extend radially, with respect to said shaft, towards each other and which are located in portions of said chamber, and outer disk surfaces and edge surfaces which extend radially outwardly of said shafts and away from said chamber, said outer disk face surfaces and edge surfaces being located in outer regions, which outer regions are located radially with respect to the shafts remote from said chamber (16); and comprising an arrangement for preventing, in operation of the apparatus and upon rotation of the processing element, the occurrence of excessive shearing stresses on the material to be processed arising adjacent said outer regions, which arrangement is characterized in that said outer regions are devoid of close confinement, and exposed to free space; and wherein in said free space no interaction effect of materials on the processing elements and supplied by said material supply means will result with any surfaces located in said regions other than said disk face surfaces and said edge surfaces of the processing elements themselves.

2. The apparatus of claim 1, further including a jacket (5) connecting said upper and lower support means, and surrounding said free space, said jacket having an inner wall spaced from the edge surfaces of said processing elements (13, 14, 15; 37; 60) by a distance which is greater than the width of said regions and is so great that no interaction between materials on the processing elements and supplied by said material supply means and the jacket will result.

3. The apparatus of claim 1, wherein at least one said support means comprises a housing jacket portion surrounding those processing elements adjacent the terminal regions of the shaft by a clearance less than 0.7 mm;

and wherein an essentially tubular jacket (5) is provided, connecting said upper and lower support means, said jacket having an inner wall spaced from the edge surfaces of said processing elements (13, 14, 15; 37, 60) by a spacing which is greater than the width of said regions and is so great that no interaction between materials to be processed by said elements and said jacket will result.

4. The apparatus of claim 3, wherein said material supply means (47-49) includes a ring duct (48, 62) and communicating duct elements (47) extending radially from said ring duct to said housing jacket portions and the processing elements (13, 60).

5. The apparatus of claim 3, wherein said housing jacket portion terminates in a conically enlarged wall portion (46).

6. The apparatus of claim 2, further including a negative pressure connecting pipe (18, 68) connected to one of said support means (3, 4) and extending therethrough, said connecting pipe communicating with said chamber (16);

and wherein connecting ducts (65, 650) are provided, communicating with said free space between the uncovered, exposed edge surfaces of said processing elements and the inner wall of said jacket (2).

7. The apparatus of claim 2, further including an additive supply line (50) extending through said jacket (5) and spanning said free space, for application of additives to the radially outer regions of said processing elements.

8. The apparatus of claim 2, in combination with biologically active materials applied to said processing elements for carrying out microbiological conversion processes during operation of the apparatus.

9. The apparatus of claim 1, wherein the disk-like processing elements (13, 14, 15; 37; 60) comprise circular processing disks (13) coaxially mounted on said shafts (1).

10. The apparatus of claim 1, wherein the disk-like processing elements comprise processing disks (29, 29a) coaxially secured to the shaft and formed with a shape which deviates from a circle concentric to the axis of the respective shafts;

and wherein said processing disks have their non-circular shape arranged in angular offset position with respect to adjacent disks.

11. The apparatus of claim 1, wherein said disk-like processing elements comprise disk elements and coaxial circular spacer disks (35) which, on adjacent shafts (1), are located in essentially similar planes and which are dimensioned such that the sum of the radii of adjacent spacer disks corresponds to the axial spacing of adjacent shafts, less an operating clearance.

12. The apparatus of claim 11, wherein the spacer disks on all the shafts (1) have essentially the same diameter.

13. The apparatus of claim 1, wherein processing elements define groups (13, 14, 15) of processing elements;

and wherein one of said groups of processing elements comprises essentially circular processing disks, coaxially mounted on those of said shafts on which the respective disks are secured, the groups of said essentially circular disk-shaped processing elements being located on said shafts in a region where the material to be processed has a relatively low viscosity.

14. The apparatus of claim 1, wherein the edge surfaces of said interdigited processing elements, and defining relatively movable surfaces, are spaced from each other by a gap (26, 27) of less than 0.7 mm.

15. The apparatus of claim 1, wherein at least one of said support means (3, 4) comprises a housing jacket portion, surrounding those processing elements adjacent the terminal regions of the shaft, and wherein positively conveying processing means (37, 60) are secured to said shafts to positively feed material vertically within said apparatus, located adjacent the terminal processing elements on said shaft, and having an axial length which is at least half the diameter of the next adjacent processing element (13, 15).

16. The apparatus of claim 1, wherein said material removal means (40-42) comprises a ring duct (41), and communicating ducts (40) communicating with material being removed from said processing elements and the ring duct.

17. The apparatus of claim 1, wherein said lower support means (4) includes a housing jacket portion surrounding those processing elements which are adjacent the lower terminal regions of the shafts;

and wherein said housing jacket portion is formed with conically tapering wall portions (39) leading towards said material removal means.

18. The apparatus of claim 17, further including positively moving material conveying means (37) located in the region of the lower support means (4) and communicating with said material removal means (40-42).

19. The apparatus of claim 1, wherein said processing elements (13, 14, 15; 37, 60) are metallic; said shafts (1) are metallic; and wherein inductive heating means (55) are provided, surrounding the shafts and the processing elements for inductively heating said shafts and said processing elements.

20. The apparatus of claim 1, in combination with biologically active materials applied to said processing elements for carrying out microbiological conversion processes during operation of the apparatus.

21. The apparatus of claim 1, wherein said shafts (1) are formed with hollow bores for circulation of cooling fluids therethrough.

* * * * *